United States Patent
Ohsawa (10) Patent No.: US 6,703,798 B2
(45) Date of Patent: Mar. 9, 2004

(54) DISCHARGE LAMP LIGHTING DEVICE

(75) Inventor: Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/372,388

(22) Filed: Feb. 25, 2003

(65) Prior Publication Data

US 2003/0173911 A1 Sep. 18, 2003

(30) Foreign Application Priority Data

Feb. 26, 2002 (JP) ........................................ 2002-050107
Jan. 10, 2003 (JP) ........................................ 2003-004884

(51) Int. Cl.$^7$ .............................................. H05B 37/02
(52) U.S. Cl. ...................... 315/307; 315/224; 315/308
(58) Field of Search ................................ 315/307, 308, 315/224, DIG. 7

(56) References Cited

U.S. PATENT DOCUMENTS 5,677,602 A * 10/1997 Paul et al. .................. 315/224
5,798,616 A * 8/1998 Takehara et al. ............ 315/247

FOREIGN PATENT DOCUMENTS

| JP | 56-11895 | 2/1981 |
| JP | 9-510046 | 10/1997 |

* cited by examiner

*Primary Examiner*—David Hung Vu
(74) *Attorney, Agent, or Firm*—Sughrue Mion, PLLC (57) ABSTRACT

A discharge lamp lighting device for AC lighting has PT(21), CT1(22), a fluctuation detection circuit (28), and a control circuit (36). PT(21) detects a voltage to be supplied to a HID bulb (5) and CT1(22) detects a current to be supplied to the HID bulb (5). The fluctuation detection circuit (28) generates an output power equivalent value obtained by adding each voltage value corresponding to each detected value by PT(21) and CT1(22), and outputs the fluctuation signal corresponding to the change of the output power equivalent value. The control circuit (36) changes a duty ratio of a control signal to be supplied to the switching transistor (6) according to the fluctuation signal.

9 Claims, 8 Drawing Sheets

DISCHARGE LAMP LIGHTING DEVICE

BACKGROUND OF THE INVENTION

1. Field of the Invention

The present invention relates to a discharge lamp lighting device capable of performing a high response control to light a discharge lamp using a transformer which detects a fluctuation of output in order to avoid any occurrence of acoustic resonance phenomenon which causes a trouble in Alternating Current (AC) lighting of the discharge lamp.

2. Description of the Related Art

Figure 9:
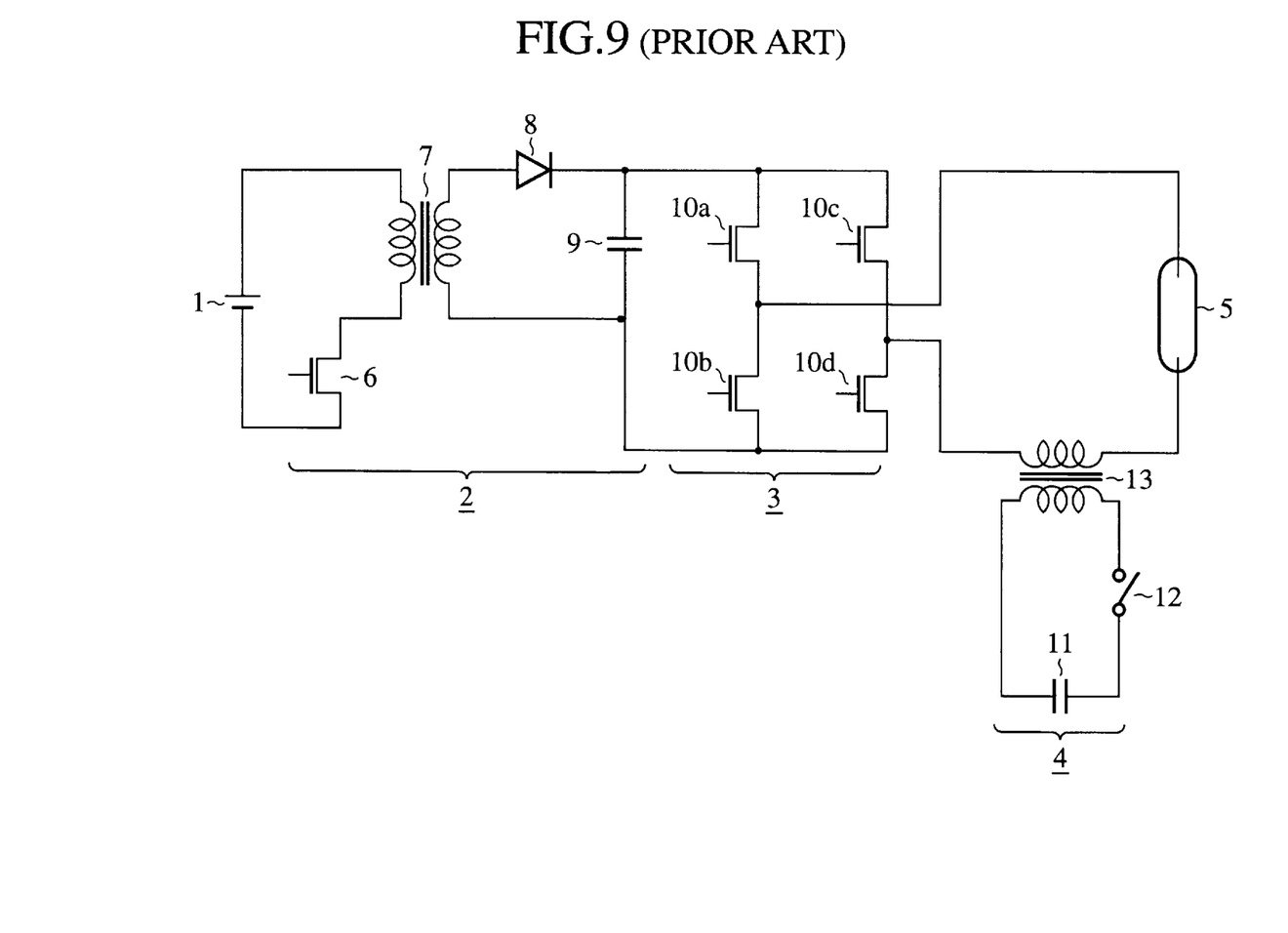
FIG. 9 is a circuit diagram showing a configuration of a conventional discharge lamp lighting device using a high voltage pulse generator.

FIG. 9 shows a circuit diagram of a discharge lamp lighting device using a high voltage pulse generator. In FIG. 9, reference number 1 designates a direct current (DC) power source, 2 denotes a DC/DC converter, 3 indicates a H-type bridge, 4 designates a high voltage pulse generator, and 5 indicates a High Intensity Discharge bulb (or a HID lamp).

In the DC/DC converter 2, reference number 6 designates a switching transistor, 7 indicates a transformer, 8 designates a diode, and 9 denotes a capacitor. Reference characters 10a–10d in the H-type bridge 3 designate switching transistors. In the high-voltage pulse generator 4, reference number 11 indicates a capacitance, 12 denotes a lighting switch, and 13 designates a lighting transformer.

Next, a description will now be given of the operation of the conventional discharge lamp lighting device.

In a starting of lighting for the HID bulb 5, the switching transistor 6 switches the voltage of the DC power source 1. The transformer 7 increases in voltage the obtained voltage and the diode 8 then rectifies the increased voltage. The obtained voltage of a relatively 400 Volts can thereby be supplied to the capacitance 9. The switching transistors 10a and 10d in the H-type bridge 3 enter ON in order to supply the DC voltage to both the electrodes of the HID bulb 5. In the high voltage pulse generation circuit 4, the lighting switch 12 enters ON and the lighting transformer 13 then increases the voltage accumulated in the capacitance 11. The obtained pulse voltage of approximately 20 KV is supplied to both the electrodes of the HID bulb 5. Thereby the HID bulb 5 initiates the discharge therein. After the completion of the lighting, the DC voltage to be supplied to the HID bulb 5 becomes from 400 Volts to 20 Volts, further, to approximately 85 Volts. After this, the switching transistors 10a–10d in the H-type bridge 3 enter ON in order to supply an alternating current (AC) voltage to the HID bulb 5, and the HID bulb 5 is thereby shifted to a steady lighting (or usual lighting).

A circuit configuration in which the diode 8, the capacitance 9, and the H-type bridge 3 are eliminated from the configuration shown in FIG. 9 shows a discharge lamp lighting device for AC lighting.

However, an acoustic resonance phenomenon frequently occurs in the discharge lamp lighting device for AC lighting. When the acoustic resonance phenomenon occurs in the discharge lamp lighting device, the arc discharge in the HID bulb 5 is fluctuated and the light emission in the HID bulb 5 become unstable.

Furthermore, when a large resonance occurs in the HID bulb 5, the acoustic resonance is reached to the inner wall of the HID bulb 5 and destroys the glass of the HID bulb 5.

In general, a resonance frequency is changed according to the shape of the glass bulb of the HID bulb 5 and the state of gases filled therein. Each HID bulb 5 have an inherent resonance frequency. A low frequency used in currently available lighting devices almost occurs no acoustic resonance phenomenon. In other words, the above low frequency is selected within a frequency range in which the stable lighting can be obtained. Therefore in order to light the HID bulb 5 out of the low frequency range for a stable lighting, it is necessary to avoid any occurrence of the acoustic resonance phenomenon. As has been well known, there are techniques to avoid an occurrence of the acoustic resonance phenomenon, for example, following Japanese patent documents 1 and 2.

Patent Document 1: Japanese laid open publication number S56-11895; and

Patent Document 2: Japanese laid open publication number H9-510046.

In order to avoid the occurrence of an acoustic resonance phenomenon, Japanese patent document 1 uses an acoustic resonance phenomenon detection means and a control means for changing a resonance frequency. This acoustic resonance phenomenon detection means detects a fluctuation of a light emitted in the HID bulb and a voltage of the electrode of the HID bulb. By the way, because the detection of the fluctuation of light requires a high accuracy detector, it is unrealistic to mount it in the discharge lamp lighting device in cost and size. In addition, only the detection of the voltage of the HID bulb cannot detect the acoustic resonance phenomenon preciously.

In order to avoid the occurrence of an acoustic resonance phenomenon, Japanese patent document 2 detects a voltage and a current of a HID bulb and the occurrence of an acoustic resonance phenomenon using a calculation means and a judgment means, and shifts a resonance frequency in order to avoid the occurrence of the acoustic resonance phenomenon. However, this technique must use a filter means before the calculation of the calculation means and the calculation result includes a time delay. Each phase is delayed in the filter means, and the calculation result thereby includes a time error. Accordingly, the circuit configuration becomes a complicated and it is difficult to detect the acoustic resonance phenomenon speedy and preciously.

Because the conventional discharge lamp lighting devices have the configurations described above, the technique of the patent document 1 including the means for avoiding the occurrence of an acoustic resonance phenomenon cannot detect the acoustic resonance phenomenon preciously, and the technique of the patent document 2 has a complicated configuration of the means for avoiding the occurrence of an acoustic resonance phenomenon, and cannot detect the occurrence of the acoustic resonance phenomenon speedy and preciously.

SUMMARY OF THE INVENTION

The present invention has been made to solve the above conventional drawback of the discharge lamp lighting device. It is therefore an object of the present invention to provide a discharge lamp lighting device with a simple configuration for speedy detecting and avoiding any occurrence of an acoustic resonance phenomenon.

In accordance with an aspect of the present invention, there is provided a discharge lamp lighting device having a fluctuation detection circuit for outputting a fluctuation signal corresponding to a change of an output power value obtained by adding detected values of a voltage detection means and a current detection means. A switching circuit is controlled in operation based on the fluctuation signal outputted.

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

First Embodiment

Figure 1:
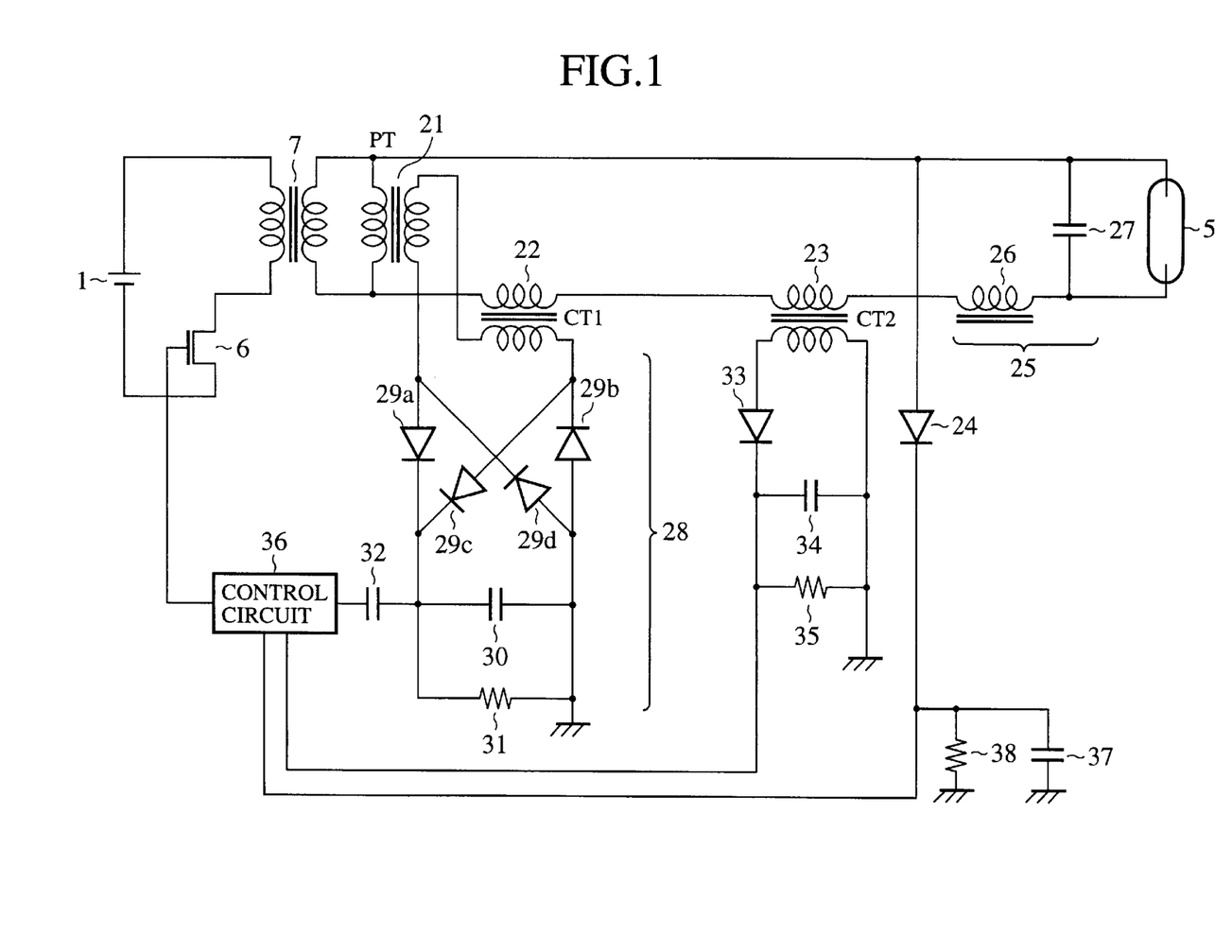
FIG. 1 is a circuit diagram showing a configuration of a discharge lamp lighting device of AC lighting according to a first embodiment of the present invention.

FIG. 1 is a circuit diagram showing a configuration of a discharge lamp lighting device of AC lighting according to a first embodiment of the present invention. In FIG. 1, reference number 1 designates a direct current power source (DC power source), 5 denotes a high intensity discharge bulb (a HID bulb as discharge lamp), 6 indicates a switching transistor (as a switching circuit), and 7 designates a transformer.

Reference number 21 designates a potentio-transformer (hereinafter, referred to as "PT": as a voltage detection means) for detecting an output voltage of the transformer 7 to be used for controlling a momentary power, and 22 denotes a current transformer (hereinafter referred to as CT1: as current detection means) for detecting an output current of the transformer 7 to be used for controlling the momentary power. Reference number 23 indicates a current transformer (hereinafter referred to as CT2: a current detection means for controlling a constant power) for detecting an output current of the transformer 7 to be used for controlling the momentary power. Reference number 24 designates a diode (as voltage detection means) for supplying the output voltage of the transformer 7 to a control circuit as the constant voltage for controlling.

Reference number 25 designates a resonance circuit for providing a high voltage to the HID bulb 5 in order to occur a breakdown in the HID bulb 5 at the initiating the lighting. Reference number 26 denotes an inductance, and 27 indicates a capacitance. Reference number 28 designates an output power equivalent value detection circuit for detecting an output power equivalent value obtained by adding each voltage corresponding to each detection value detected by the PT 21, CT1 22. Reference characters 29a–29d denote diodes, 30 indicates a capacitance, 31 designates a resistance. Reference number 32 denotes a capacitance (as a differential circuit) for performing a differential operation for the output power equivalent value, and outputting a fluctuation signal. The fluctuation circuit is made up of the output power equivalent value detection circuit 28 and the capacitance 32. Reference number 33 designates a diode, 34 and 37 indicate capacitances, and 35 and 38 designate resistances.

Reference number 36 designates the control circuit for changing a duty ratio or a switching frequency of the control signal to be supplied to the switching transistor 6 according to the output current and the output voltage from the CT2 23 and the diode 24. Further, the control circuit 36 can avoid any occurrence of an acoustic resonance phenomenon. The control circuit 36 also changes a duty ratio of a control signal or a switching frequency to be supplied to the switching transistor 6 according to a voltage value (as the fluctuation signal). This voltage value is obtained by performing the differential operation for a fluctuation of the output power equivalent value outputted from the output power equivalent detection circuit 28 by the capacitance 32.

Figure 2:
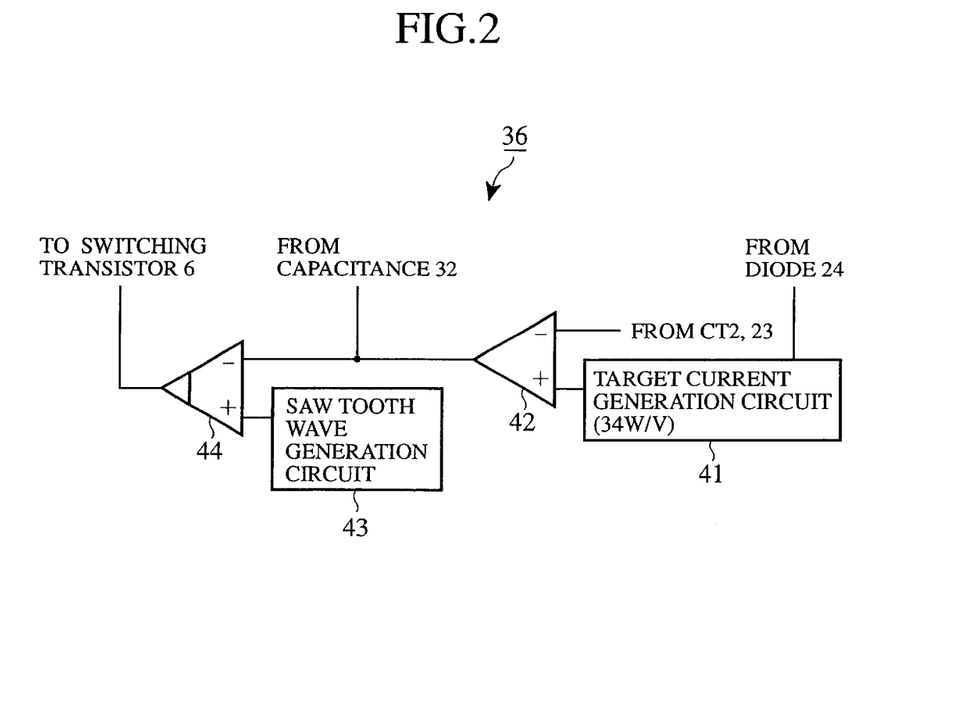
FIG. 2 is a block diagram showing a detailed circuit configuration of a control circuit.

FIG. 2 is a block diagram showing a detailed circuit configuration of the control circuit 36. In FIG. 2, reference number 41 designates a target current generation circuit for generating a target current for use in the control of the constant power using the output voltage supplied through the diode 24. Reference number 42 denotes a calculation amplifier, one terminal (+) thereof receives the target current, and the other terminal (−) thereof receives the output current for the constant power control through the CT2 23. Reference number 43 indicates a saw tooth wave generation circuit. Reference number 44 denotes a comparator, one terminal (+) thereof is connected to the saw tooth wave generation circuit 43, the other terminal (−) thereof is connected to the output of the calculation amplifier 42, and the other terminal (−) thereof is connected to the output of the capacitance 32, which is added with the change of the fluctuation signal. The output terminal of the comparator 44 is connected to the gate of the switching transistor 6.

Next, a description will now be given of the operation of the discharge lamp lighting device of the first embodiment.

In FIG. 1, at the starting of the lighting of the HID bulb 5, the voltage of the DC power source 1 is switched by the switching transistor 6, so that a frequency of the voltage is gradually increased. The AC voltage increased by the transformer 7 is supplied to the resonance circuit 25. When the frequency of the voltage reaches the resonance frequency corresponding to the inductance 26 and the capacitance 27, the high voltage is generated at both the electrodes of the capacitance 27. This high voltage is supplied to both the electrodes of the HID bulb 5. The HID bulb 5 thereby initiates the discharge therein.

The CT2 23 detects the output current of the transformer 7, namely, the current to be supplied to the HID bulb 5. This current is supplied as the voltage, which is obtained by rectifying and smoothing the current, to the control circuit 36 to be used for the control of the constant power. The diode 24 detects the voltage of the transformer 7, namely the voltage to be supplied to the HID bulb 5. This voltage detected by the diode 24 is supplied as the rectified and smoothed voltage to the control circuit 36 for the control of the constant power.

In FIG. 2, the target current generation circuit 41 generates the target current from the output voltage supplied through the diode 24 for the control of the constant power. For example, when the target power is 34 W (Watt), the target current is generated by the 34 W/V (Watt/Voltage). The calculation amplifier 42 compares the target current with the output current for the control of the constant power supplied through the CT2 23, and outputs a difference of them. The comparator 44 compares the saw teeth wave generated by the saw teeth wave generation circuit 43 with the output signal of the calculation amplifier 42, changes the duty ratio of the control signal to be supplied to the switching transistor 6 in order to control the constant power to be supplied to the HID bulb 5.

Next, a description will now be given of the detection of the acoustic resonance phenomenon and the avoiding operation thereof.

In FIG. 1, the PT21 detects the output voltage of the transformer 7, namely the voltage to be supplied to the HID bulb 5. The CT1 22 detects the output current of the transformer 7, that is, the current to be supplied to the HID bulb 5.

The acoustic resonance phenomenon in the HID bulb 5 during AC lighting is generated according to the output voltage to be supplied to the HID bulb 5. When the acoustic resonance phenomenon occurs in the HID bulb 5, the output voltage to be supplied to the HID bulb 5 is rapidly changed. By using this characteristic, the output voltage equivalent value detection circuit 28 detects the estimated output power to be supplied to the HID bulb 5 based on the voltage value added with each detected value by the PT21 and CT1 22. The diodes 29a–29d rectify the voltage value, and the capacitance 30 and the resistance 31 smooth the rectified output voltage equivalent value. Furthermore, the differential operation of the output voltage equivalent value is performed by the capacitance 32. The capacitance then outputs the fluctuation signal.

In general, the output power can be obtained by $V_L \times I_L$, where $V_L$ is the detected output voltage, and $I_L$ is the output current. It is therefore difficult to form the circuit corresponding to the above calculation.

In this embodiment, because an approximate value is obtained by adding $V_L$ and $I_L$, it is possible to obtain the output voltage value rapidly. That is,

OUTPUT VOLTAGE=[{$VL$×(TURN RATIO)}−(OFFSET VALUE)]×(GAIN VALUE).

At this time, the offset value and gain value are obtained based on the characteristic in design every a discharge lamp lighting device.

Further, the offset value can be eliminated by performing the differential of the estimated output power obtained by the above equation. Thus, it is not necessary to consider the offset value when the differential value of the output voltage equivalent value is used in the detection for the fluctuation.

Furthermore, the gain value can be set to a proper value by adjusting the characteristic of the capacitance in the circuit.

Here, one example of the above equation will be shown.

It can be so set that the offset value is 2.5, and the gain value is 13.6, where a turn ratio of the PT 21 is 85:2.5 and a turn ratio of the CT1 22 is 0.4:2.5. That is, when the rated voltage is 85 V, and the rated current is 0.4 (A), the output power is $V_L \times I_L = 85(V) \times 0.4(A) = 34(W)$, and The output power equivalent value becomes $\{\{(85) \times (2.5/85)\} \times (0.4) \times (2.5/0.4)\} - 2.5\} \times 13.6 = 34(W)$.

It is possible to approximately obtain the output power equivalent value using the addition calculation.

Thus, when a constant value is added to the voltage value obtained by adding each detected value of the PT 21 and CT1 22, it is possible to detect a pseudo output power to be supplied to the HID bulb 5.

When the PT 21 and the CT1 22 are connected in opposite phase to each other, that is, when both are subtracted (V−I), it is possible to clearly detect the change of each detected value.

The capacitance 32 performs the differential of the output voltage equivalent value supplied from the output power equivalent value detection circuit 28, and then outputs the fluctuation signal to the control circuit 36.

In FIG. 2, because the control circuit 36 adds the fluctuation signal to the output signal from the calculation amplifier 42, when the acoustic resonance phenomenon occurs, the control circuit 36 changes the duty ratio of the control signal, to be supplied from the comparator 44 to the switching transistor 6, based on the change of the fluctuation signal, so that the power to be supplied to the HID bulb 5 is thereby changed in order to avoid any occurrence of the acoustic resonance phenomenon.

As described above, according to the first embodiment, the output power equivalent value detection circuit 28 detects a pseudo output voltage to be supplied to the HID bulb 5 based on the voltage value which is obtained by adding each voltage value corresponding to each detected value of the PT 21 and CT1 22. The control circuit 36 judges the generation of the acoustic resonance phenomenon occurred in the HID bulb 5 during AC lighting based on the fluctuation of the output power equivalent value. The control circuit 36 then changes the duty ratio of the control signal to be supplied to the switching transistor 6 in order to change the output power to be supplied to the HID bulb 5.

Because the acoustic resonance phenomenon generated in the lighting of the HID bulb 5 is generated according to the output power to be supplied to the HID bulb 5, it is possible to avoid any occurrence of the acoustic resonance phenomenon by changing the output power to be supplied to the HID bulb 5.

By the way, it is also possible to avoid any occurrence of the acoustic resonance phenomenon by changing the switching frequency.

Furthermore, it is possible to very easily and quickly detect the acoustic resonance phenomenon and to avoid the occurrence of it based on the voltage value obtained by adding each detected value of the output voltage and output current without any timing delay and with a simple configuration.

Still furthermore, because the discharging lamp lighting device has the capacitance 32 which performs the differential operation for the output power equivalent value supplied from the output power equivalent value detection circuit 28, and outputs the operation result as the fluctuation signal to the control circuit 36, it is possible to transfer the fluctuation signal to the control circuit 36 with a good response, and it is thereby possible to speedy detect and avoid any occurrence of the acoustic resonance phenomenon.

Moreover, it is possible to select one voltage detection means in the PT 21 for the momentary power control and the diode 24, and to commonly use the selected one for the constant power control. Furthermore, it is also possible to commonly use one of the CT21 22 for the momentary power control and the CT2 23 for the constant power control.

Second Embodiment

Figure 3:
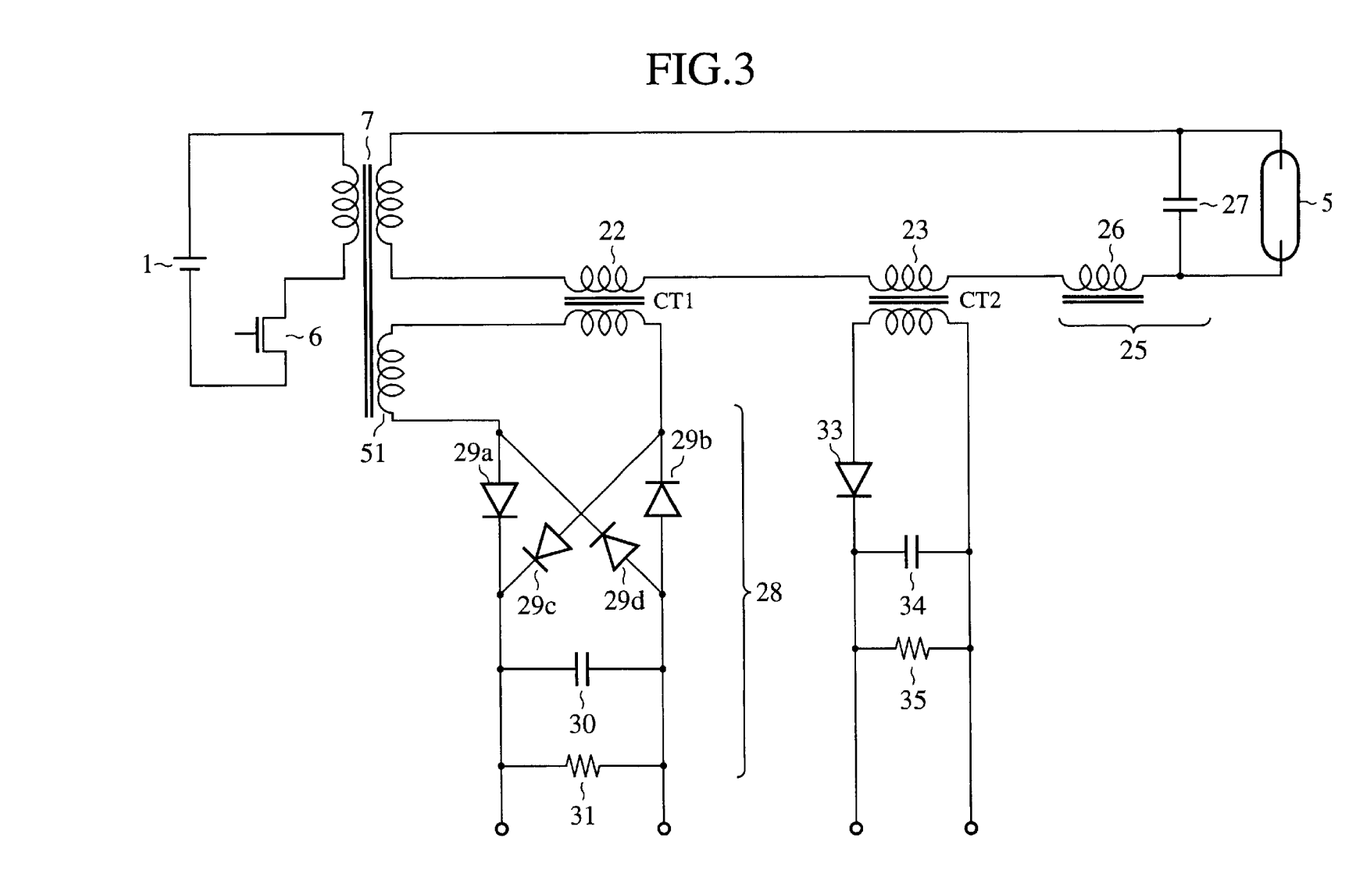
FIG. 3 is a circuit diagram showing a configuration of a discharge lamp lighting device of AC lighting according to a second embodiment of the present invention.

FIG. 3 is a circuit diagram showing a configuration of a discharge lamp lighting device of AC lighting according to a second embodiment of the present invention. In FIG. 3, reference number 51 designates an auxiliary winding (as voltage detection mean) in a secondary winding of the transformer 7. In the second embodiment, the auxiliary winding 51 is used instead of the PT 21 in the configuration of the first embodiment shown in FIG. 1. Other components are the same of those in the first embodiment.

Because the output voltage to be supplied to the HID bulb 5 is outputted through the secondary side of the transformer 7, when the auxiliary winding 51 is mounted in the secondary side of the transformer 7, it is possible for the auxiliary winding 51 to detect the voltage correlated to the output voltage of the transformer 7. Further, when the winding ratio between the output winding of the secondary side of the transformer 7 and the auxiliary winding 51 is 85:2.5, it is possible to obtain the same effect of the first embodiment.

As described above, according to the second embodiment, it is not necessary to use the PT 21 when the auxiliary winding 51 is formed in the secondary side of the transformer 7. This can obtain a simple configuration of the discharge lamp lighting device.

Third Embodiment

Figure 4:
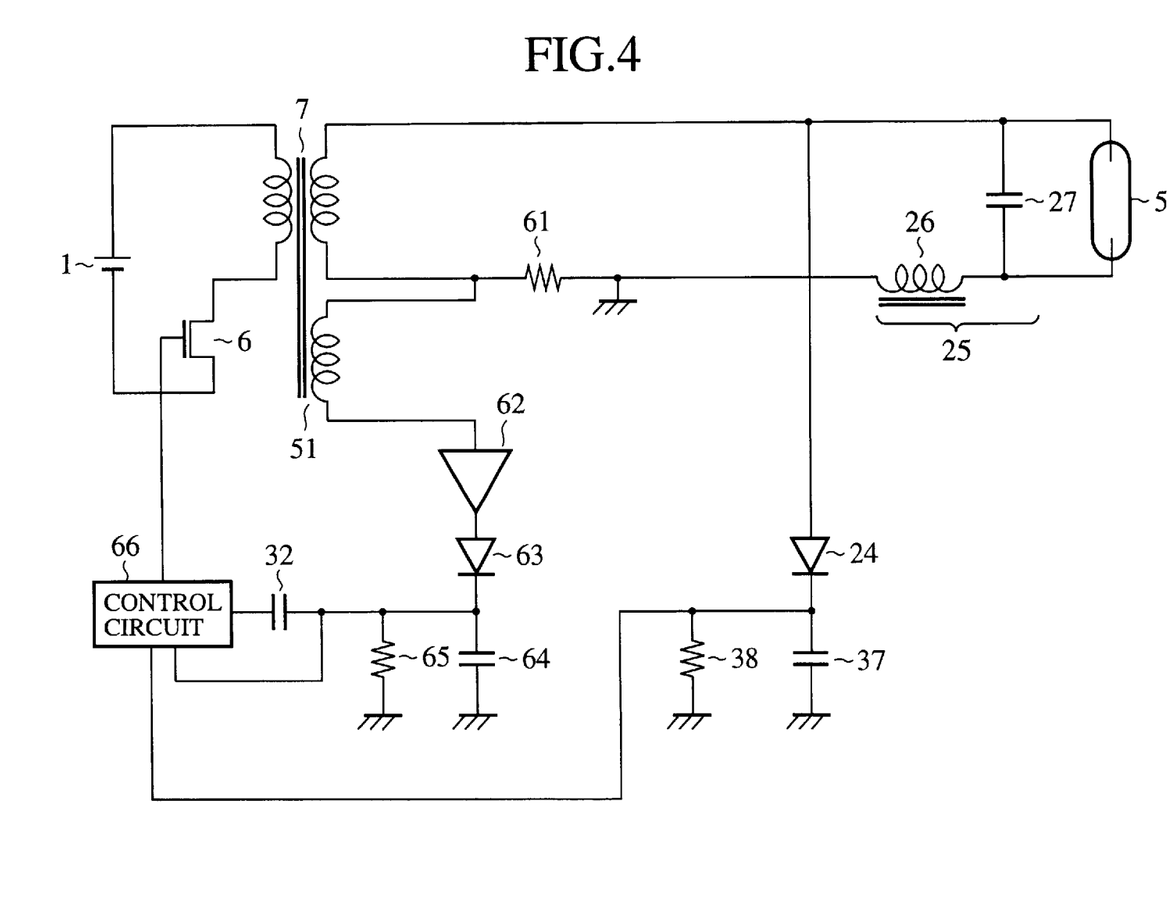
FIG. 4 is a circuit diagram showing a configuration of a discharge lamp lighting device of AC lighting according to a third embodiment of the present invention.

FIG. 4 is a circuit diagram showing a configuration of a discharge lamp lighting device of AC lighting according to a third embodiment of the present invention.

In FIG. 4, reference number 61 designates a shunt resistance (as current detection means) for detecting the output current, and 62 denotes an amplifier for amplifying a voltage obtained by adding a voltage (as equivalent to the output current) generated at the shunt resistance 61 and a voltage generated at the auxiliary winding 51 in the secondary side of the transformer 7. Reference 63 indicates a diode, 64 designates a capacitance, and 65 indicates a resistance.

Reference number 66 designates a control circuit for compensating the output power equivalent value generated using the output voltage from the diode 24, changing the duty ratio of the control signal or the switching frequency to be supplied to the switching transistor 6, controlling the constant power to be supplied to the HID bulb 5, and further changing the duty ratio of the control signal or the switching frequency to be supplied to the switching transistor 6 according to the fluctuation signal from the capacitance 32. The control circuit 66 thereby avoids any occurrence of the acoustic resonance phenomenon in the HID bulb 5.

Figure 5:
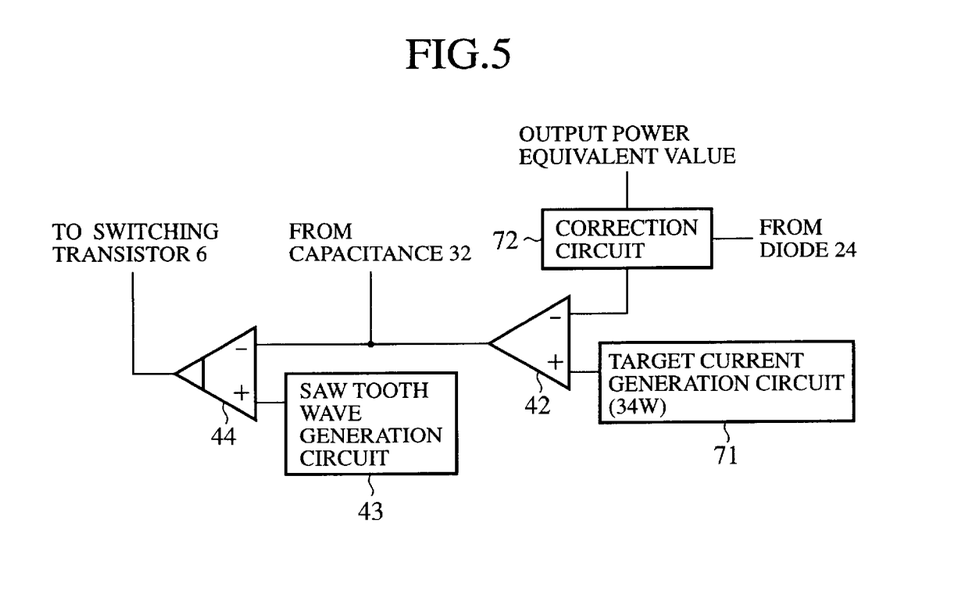
FIG. 5 is a block diagram showing a detailed circuit configuration of a control circuit.

FIG. 5 is a block diagram showing a detailed circuit configuration of the control circuit 66.

In FIG. 5, reference number 71 designates a target power generation circuit for generating a target power to be used for the control of the constant power (as a fixed value, 34 Watts in usual state, for example). Reference number 72 denotes a correction circuit (as correction means) for correcting the output voltage equivalent value generated by the amplifier 62. The target power is supplied to the terminal (+) of the calculation amplifier 42, and the corrected output power equivalent value is supplied to the terminal (−) of the calculation amplifier 42. Other components are the same of those in the configuration shown in FIG. 2.

Next, a description will now be given of the operation of the discharge lamp lighting device of the third embodiment.

In FIG. 4, the shunt resistance 61 detects the output current of the transformer 7, namely the current to be supplied to the HID bulb 5, based on its voltage drop. The auxiliary winding 51 in the secondary side of the transformer 7 detects the output voltage from the transformer 7, namely the voltage to be supplied to the HID bulb 5. Both the output current and the output voltage from the transformer 7 are added. Here, because the voltage drop generated at the shunt resistance 61 is relatively small when compared with the voltage generated at the CT1 22 in the configuration of the first embodiment, the number of the auxiliary winding 51 is reduced according to the magnitude of this voltage drop. Both the voltage drop value and the voltage generated at the auxiliary winding 51 are added, and the amplifier 62 amplifies the added value to a voltage of a necessary level. The amplified voltage is rectified by the diode 63, smoothed by both the capacitance 64 and the resistance 65, and then supplied as the output voltage equivalent value to the control circuit 66.

The differential operation is performed for the output voltage equivalent value at the capacitance 32. The capacitance 32 outputs the fluctuation signal as the operation result to the control circuit 66. Further, the output voltage from the transformer 7 inputted through the diode 24 and smoothed by both the capacitance 37 and the resistance 38 is supplied to the control circuit 66.

In FIG. 5, the target power generation circuit 71 generates the target power for the constant power control as a fixed value of 34W in usual state.

The correction circuit 72 corrects the output power equivalent value generated by the amplifier 62 using the output voltage supplied through the diode 24. That is, in the first embodiment previously described, although the approximation output power equivalent value is obtained by adding the detected output voltage $V_L$ and the detected output current $I_L$, this manner makes an error between the output power equivalent value and an actual output power.

In the first embodiment previously described, following values P and P' are obtained.

$$P = V_L \times I_L,$$

$$P' = [\{V_L \times (\text{Winding ratio}) + I_L \times (\text{Winding ratio})\} - (\text{Offset value})] \times (\text{Gain value}),$$

where P is actual power and P' is output power equivalent value.

On the contrary, the following relationships are satisfied.

$$(\text{Winding ratio}) = (\text{Offset value})/(\text{Rated voltage}),$$

$$(\text{Winding ratio}) = (\text{Offset value})/(\text{Rated current}),$$

and $$(\text{Gain value}) = (\text{rated power})/(\text{Offset value}).$$

Therefore, P and P' can be calculated by the following equations.

$$P' = [\{V_L/(\text{Rated voltage}) + I_L/(\text{Rated current})\} - 1] \times (\text{Rated power}).$$

In addition, when $P = V_L \times I_L = (\text{Rated power})$, the relationship between P and P' becomes as follows:

$$P'/P = (\text{Rated current})/I_L + I_L/(\text{Rated current}) - 1,$$

or $$P'/P = (\text{Rated current})/V_L + V_L/(\text{Rated current}) - 1.$$

Thus, it is possible to obtain the error between the actual output voltage P and the output voltage equivalent value P' using the output voltage $V_L$ and output current $I_L$.

In the third embodiment, the correction circuit 72 corrects an error involved in the output power equivalent value using the output voltage which is inputted to the correction circuit 72 through the diode 24.

The calculation amplifier 42 compares the target power with the corrected output power equivalent value, and amplifies a difference as the comparison result and outputs the amplified one. The comparator 44 compares the saw tooth wave generated by the saw tooth wave generation circuit 43 with the output signal from the calculation amplifier 42, changes the duty ratio of the control signal to be supplied to the switching transistor 6 in order to control the constant power to be supplied to the HID bulb 5.

Like the manner of the first embodiment, when detecting the fluctuation signal from the capacitance 32, the control circuit 66 changes the duty ratio of the control signal to be supplied from the comparator 44 to the switching transistor 6, and also changes the power to be supplied to the HID bulb 5 in order to avoid any occurrence of the acoustic resonance phenomenon in the HID bulb 5.

As described above, according to the third embodiment, because the correction circuit 72 corrects the output power equivalent value using the detected voltage value or the detected current value, it is possible to correct the output power equivalent value using a simple configuration, and to control the operation of the switching circuit using a value which is approximately equal to the actual power. Thus, it is possible to perform the power control using a simple circuit configuration with high accuracy.

In the case of the first embodiment previously described, in order to output the rated power to the HID bulb 5, the output voltage of the transformer 7 is inputted and an optimum output current is calculated as a target current to be used for the control. On the contrary, in the third embodiment, it is not necessary to calculate the target current using the output voltage, and it is possible to control the constant voltage to be supplied to the HID bulb using the target power. This can perform a feedback control and achieve a high responsiveness.

Further, because the shunt resistance 61 detects the output current, it is possible to form the discharge lamp lighting device with a simple configuration when compared with the configuration using the CT1 22.

By the way, it is possible to commonly use one of the auxiliary winding 51 for the momentary power control and the diode 24 for the constant power control as the voltage detection means.

Still further, because the correction circuit 72 in the third embodiment the output power equivalent value is corrected using the detected value of the output voltage detected by the diode 24, it is also possible to correct it using the output current value detected by the shunt resistance 61.

Fourth Embodiment

Figure 6:
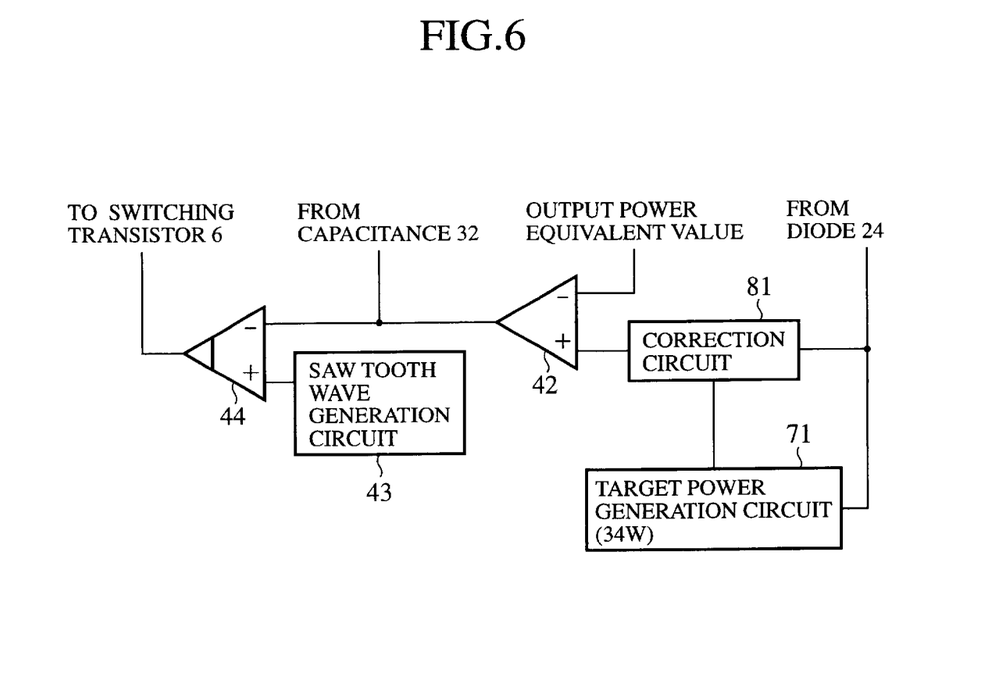
FIG. 6 is a circuit diagram showing a configuration of a discharge lamp lighting device of AC lighting according to a fourth embodiment of the present invention.

FIG. 6 is a circuit diagram showing a configuration of a discharge lamp lighting device of AC lighting according to a fourth embodiment of the present invention. In FIG. 6, reference number 81 designates a correction circuit (as correction means) for correcting a target voltage generated by the target power generation circuit 71 using the output voltage obtained through the diode 24. Other components are the same of those in the third embodiment shown in FIG. 5.

In the case of the third embodiment previously described, the correction circuit 72 corrects the output power equivalent value. On the contrary, in the fourth embodiment, the correction circuit 81 corrects the target power generated in the target power generation circuit 71.

As describe above, according to the fourth embodiment, because the correction circuit 81 corrects the target power using the detected voltage value or the detected current value, it is possible to correct the target power using a simple configuration, and to control the operation of the switching circuit using a value which is approximately equal to the actual output power. Thus, it is possible to perform the power control using a simple circuit configuration with high accuracy.

Fifth Embodiment

Figure 7:
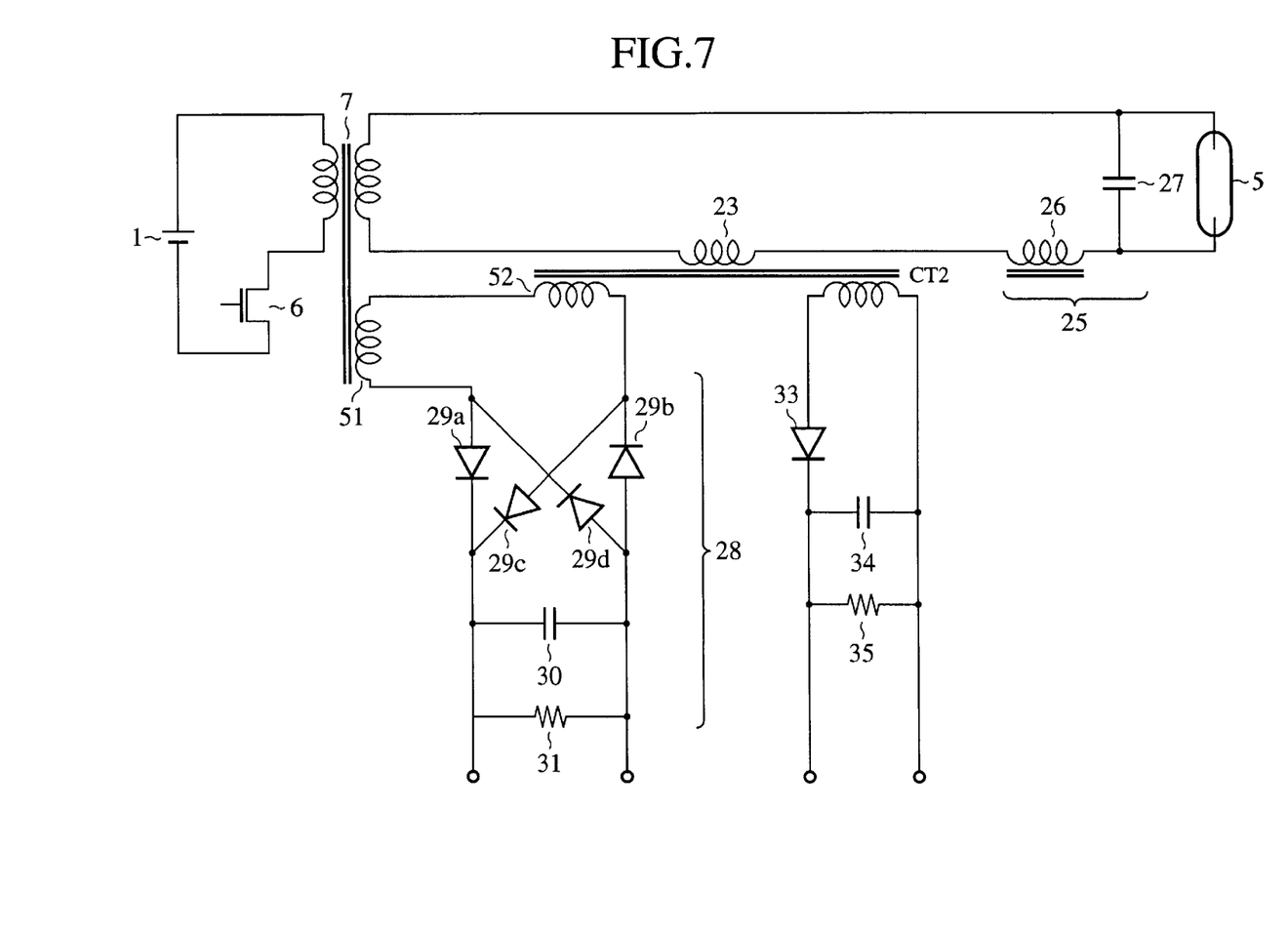
FIG. 7 is a circuit diagram showing a configuration of a discharge lamp lighting device of AC lighting according to a fifth embodiment of the present invention.

FIG. 7 is a circuit diagram showing a configuration of a discharge lamp lighting device of AC lighting according to a fifth embodiment of the present invention. In FIG. 7, reference number 52 designates an auxiliary winding (as current detection means) in the secondary side of the transformer CT2 23. Other components are the same of those in the second embodiment shown in FIG. 3.

As described above, according to the fifth embodiment, because the auxiliary winding 52 is used as the CT1 22 in the configuration shown in FIG. 1, thus, the CT1 22 is not necessary, it is possible to form the discharge lamp lighting device with a simple configuration.

Sixth Embodiment

Figure 8:
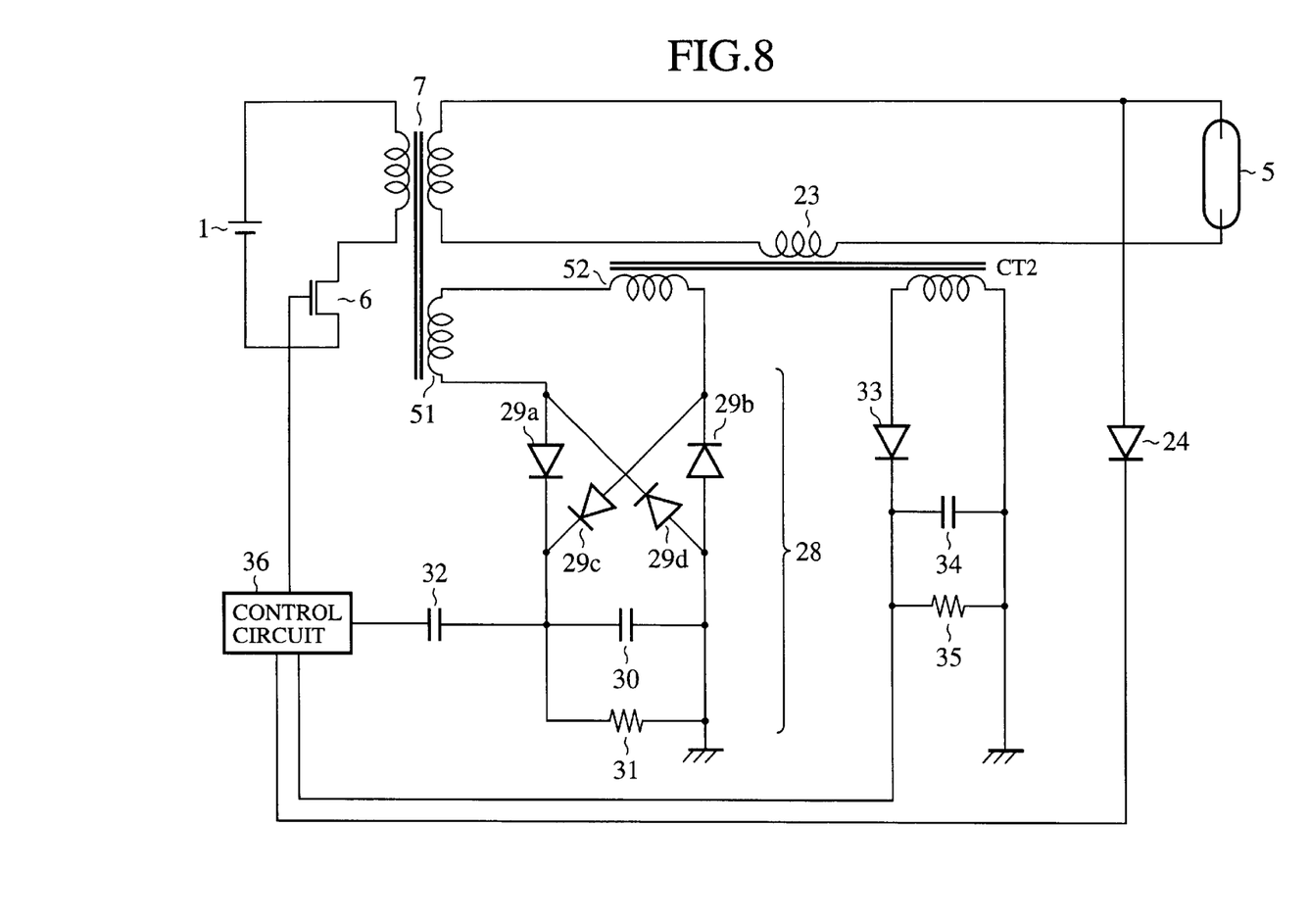
FIG. 8 is a circuit diagram showing a configuration of a discharge lamp lighting device of AC lighting according to a sixth embodiment of the present invention.

FIG. 8 is a circuit diagram showing a configuration of a discharge lamp lighting device of AC lighting according to a sixth embodiment of the present invention. In the configuration shown in FIG. 8, the inductance 26 and capacitance 27 forming the resonance circuit 25 shown in FIG. 7 are eliminated. Other components are the same of those in the fifth embodiment shown in FIG. 7.

In the sixth embodiment, a high frequency discharge is generated between the electrodes of the HID bulb 5 in order to initiate the lighting of the HID bulb 5. The high frequency is generated by the operation of the switching transistor 6 under the control of the control circuit 36.

Like the manner of the first embodiment, because the discharging lamp lighting device of the sixth embodiment has the capacitance 32 which performs the differential operation of the output power equivalent value from the output power equivalent value detection circuit 28 and outputs the operation result as the fluctuation signal to the control circuit 36, it is possible to transfer the fluctuation signal to the control circuit 36 with a good response, and it is thereby possible to speedy detect and avoid any occurrence of the acoustic resonance phenomenon. Therefore it is possible to expand the frequency range of the output voltage to be supplied to the HID bulb 5. When the frequency of the output voltage is expanded within a range of MHz or more, the dielectric breakdown occurs in the gas at the electrodes of the HID bulb 5, a high frequency corona discharge occurs, and a current flows between the electrodes of the HID bulb 5. This high frequency corona discharge is used as a trigger for lighting of the HID bulb 5. As a result, it is possible to eliminate an igniter such as the resonance circuit 25 which generates the dielectric breakdown when receiving a high voltage.

In addition, after the initiation of the lighting of the HID bulb 5 with a high frequency discharge, the value of the lighting frequency is reduced. Under the control of the control circuit 36, the operation of the switching transistor 6 can reduce the lighting frequency.

Because the lighting of the HID bulb 5 requires the use of a high frequency of MHz or more, it includes a power radiated as a radio noise, and the HID bulb 5 lights with a low frequency, which generates no radio noise, during the usual lighting after the start of the lighting.

In addition, the high frequency characteristic of the switching transistor 6 and the transformer 7 is lower in noise than the low frequency characteristics, the operational efficiency in the high frequency is reduced. The lighting operation with the high frequency is therefore performed for a moment, and the low frequency with a high efficiency is used during the usual lighting operation.

As described above, according to the sixth embodiment, because any occurrence of the acoustic resonance phenomenon can be avoided and a current can flow between the electrodes in the high frequency corona discharge of the HID bulb, it is possible to eliminate an igniter such as the resonance circuit 25 for generating the dielectric breakdown with a high voltage.

Furthermore, it is possible to avoid the generation of the radio noise by a high frequency voltage for the corona discharge, which is overlapped in frequency to the radio frequency band, and possible to avoid the reduction of a power conversion efficiency caused by the high frequency operation of the switching transistor 6 and the transformer 7.

As set forth, according to the present invention, the discharge lamp lighting device has the fluctuation detection circuit for outputting a fluctuation signal corresponding to the change of the output power equivalent value obtained by adding the detected values by the voltage detection means and the current detection means, and the operation of the switching circuit is controlled using this fluctuation signal. Therefore the fluctuation detection circuit calculates a pseudo output power based on the voltage value obtained by adding each detected value of the output voltage and the output current, and detects the fluctuation signal according to the change of the output power equivalent value.

Further, the occurrence of the acoustic resonance phenomenon during the AC lighting of the discharge lamp is judged based on the fluctuation signal, and the control signal is thereby changed in order to change the output power to be supplied to the discharge lamp. Because the acoustic resonance phenomenon during the AC lighting of the discharge lamp is generated according to the magnitude of the output power supplied to the discharge lamp, it is possible to avoid any occurrence of the acoustic resonance phenomenon by changing the output power to be supplied to the HID bulb.

Further, it is possible to easily detect the occurrence of the acoustic resonance phenomenon based on the voltage value obtained by adding each detected value of the output voltage and the output current. Because no time delay occurs in the filter process and the calculation, it is possible to detect the occurrence of the acoustic resonance phenomenon promptly with a simple configuration, and to avoid any occurrence of the acoustic resonance phenomenon in the discharge lamp.

Still further, according to the present invention, the discharge lamp lighting device has the correction means for correcting the output power equivalent value using at least one detected value obtained by the voltage detection means and the current detection means. The switching circuit is controlled based on the output power equivalent value corrected by the correction means and the fluctuation signal outputted from the fluctuation detection circuit. It is thereby possible to correct the output power equivalent value with a simple configuration and to control the switching circuit using the value which is approximately equal to an actual output power, and thereby possible to perform the power control with a simple configuration and with high accuracy.

According to the present invention, the discharge lamp lighting device has the correction means for correcting the generated output power equivalent value or the target power using at least one detected value obtained by the voltage detection means and the current detection means. The switching circuit is controlled based on one of the output power equivalent value corrected by the correction means and the target value, non-corrected one, and the fluctuation signal outputted from the fluctuation detection circuit. It is thereby possible to correct the output power equivalent value or the target value with a simple configuration and to control the switching circuit using the value which is approximately equal to an actual output power, and thereby possible to perform the power control with a simple configuration and with high accuracy.

Moreover, according to the present invention, the voltage detection means is mounted as auxiliary winding in the secondary side of the transformer, when the auxiliary winding is formed in the secondary side of the transformer it is not necessary to have the voltage detection means, and it is thereby possible to form the discharge lamp lighting device with a simple configuration.

Still moreover, according to the present invention, the current detection means is mounted as auxiliary winding in the secondary side of the constant power control current detection means, it is not necessary to have the current detection means, and it is thereby possible to form the discharge lamp lighting device with a simple configuration.

In addition, according to the present invention, because the current detection means is made up of a resistance, it is possible to form the current detection means with a simple configuration.

Further, according to the present invention, because the fluctuation detection circuit has a differential circuit for performing the differential operation for the output power equivalent value and outputting the fluctuation signal, it is possible to transfer the fluctuation signal with a good response and to quickly detect the occurrence of the acoustic resonance phenomenon and thereby possible to avoid any occurrence of the acoustic resonance phenomenon.

Moreover, according to the present invention, because the lighting of the discharge lamp is initiated by generating the high frequency discharge between the electrodes of the discharge lamp, it is possible to avoid any occurrence of the acoustic resonance phenomenon and possible to flow a current between the electrodes of the discharge lamp by the corona discharge. It is thereby possible to eliminate from the discharge lamp lighting device any resonance circuit such as an igniter which causes a dielectric breakdown by applying the high voltage.

Further, according to the present invention, it is so controlled that the lighting frequency is reduced after the start of the lighting with a high frequency discharge. It is therefore possible to avoid any generation of a radio noise caused by a high frequency for use in the generation of a corona discharge, which is overlapped with a frequency of a radio frequency band, and it is also possible to avoid the reduction of the power conversion efficiency by the high frequency operation of the switching circuit and the transformer.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A discharge lamp lighting device comprising:
   a switching circuit, connected to a power source, for generating a rectangle wave by its ON/OFF operation according to a control signal;
   a transformer for increasing in voltage the rectangle wave generated by the switching circuit and then supplying the increased rectangle wave to a discharge lamp;

voltage detection means for detecting an output voltage of the transformer;

current detection means for detecting an output current of the transformer;

a fluctuation detection circuit for generating an output power equivalent value by adding each detected value by the voltage detection means and the current detection means, and for outputting a fluctuation signal corresponding to a change of the output power equivalent value; and a control circuit for controlling operation of the switching circuit according to the fluctuation signal outputted from the fluctuation detection circuit.

2. The discharge lamp lighting device as claimed in claim 1, further comprises correction means for correcting the generated output power equivalent value using the detected value of at least one of the voltage detection means and the current detection means, wherein the control circuit controls the operation of the switching circuit according to the output power equivalent value corrected by the correction means and the fluctuation signal outputted from the fluctuation detection circuit.

3. The discharge lamp lighting device as claimed in claim 1, further comprises correction means for correcting the output power equivalent value generated and a target power using the detected value of at least one of the voltage detection means and the current detection means, wherein the control circuit controls the operation of the switching circuit according to one of the output power equivalent value corrected by the correction means and the target power, non-corrected one, and the fluctuation signal outputted from the fluctuation detection circuit.

4. The discharge lamp lighting device as claimed in claim 1, wherein the voltage detection means is made up of an auxiliary winding in a secondary side of the transformer.

5. The discharge lamp lighting device as claimed in claim 1, further comprises current detection means made up of an auxiliary winding in a secondary side of a constant power detection means for detecting an output current from the transformer, and for outputting an averaged output current of the detected output current for use in a constant power control.

6. The discharge lamp lighting device as claimed in claim 1, wherein the current detection means comprises a resistance.

7. The discharge lamp lighting device as claimed in claim 1, wherein the fluctuation detection circuit comprises a differential circuit for performing a differential operation of the output power equivalent value and for outputting the fluctuation signal.

8. The discharge lamp lighting device as claimed in claim 1, wherein the control circuit controls the operation of the switching transistor so that a lighting of the discharge lamp is initiated by generating a high frequency discharge between electrodes of the discharge lamp.

9. The discharge lamp lighting device as claimed in claim 8, wherein the control circuit reduces the lighting frequency to be supplied to the discharge lamp after the completion of the start of the lighting.

* * * * *